(12) United States Patent  
Swoboda

(10) Patent No.: US 7,747,901 B2
(45) Date of Patent: Jun. 29, 2010

(54) AUXILIARY LINK CONTROL COMMANDS

(75) Inventor: Gary L. Swoboda, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 879 days.

(21) Appl. No.: 11/458,841

(22) Filed: Jul. 20, 2006

(65) Prior Publication Data

US 2007/0038433 A1 Feb. 15, 2007

Related U.S. Application Data

(60) Provisional application No. 60/701,428, filed on Jul. 20, 2005.

(51) Int. Cl.
*G06F 11/00* (2006.01)
*G01R 31/28* (2006.01)
*G06F 9/455* (2006.01)

(52) U.S. Cl. .................... 714/30; 714/724; 714/734; 714/742

(58) Field of Classification Search ................. 714/29, 714/30, 724, 726, 731, 734, 741, 742, 744; 326/16

See application file for complete search history.

(56) References Cited

U.S. PATENT DOCUMENTS

| 5,130,988 | A | * | 7/1992 | Wilcox et al. | 714/727 |
| 5,321,701 | A | * | 6/1994 | Raymond et al. | 714/736 |
| 6,108,803 | A | * | 8/2000 | Sase | 714/718 |
| 6,127,948 | A | * | 10/2000 | Hillis et al. | 341/4 |
| 6,727,723 | B2 | * | 4/2004 | Shimizu et al. | 324/765 |
| 6,877,121 | B1 | * | 4/2005 | Srinivasaiah et al. | 714/727 |
| 7,174,492 | B1 | * | 2/2007 | Chung et al. | 714/727 |
| 7,269,770 | B1 | * | 9/2007 | Chung et al. | 714/727 |

* cited by examiner

*Primary Examiner*—Vibol Tan
(74) *Attorney, Agent, or Firm*—Robert D. Marshall, Jr.; Wade J. Brady, III; Frederick J. Telecky, Jr.

(57) ABSTRACT

Control commands are transmitted via an emulation interface holding a test clock signal at a constant value and switching a test mode select signal a number of times corresponding to the control command. A receiving system counts switches of the test mode select signal switches while the test clock is constant and interprets the number of switches as a corresponding control command.

4 Claims, 4 Drawing Sheets

AUXILIARY LINK CONTROL COMMANDS

CLAIM OF PRIORITY

This application claims priority under 35 U.S.C. 119(e)(1) to U.S. Provisional Application No. 60/701,428 filed Jul. 20, 2005.

TECHNICAL FIELD OF THE INVENTION

The technical field of this invention is control command transmission in emulation systems.

BACKGROUND OF THE INVENTION

Advanced wafer lithography and surface-mount packaging technology are integrating increasingly complex functions at both the silicon and printed circuit board level of electronic design. Diminished physical access is an unfortunate consequence of denser designs and shrinking interconnect pitch. Designed-in testability is needed, so that the finished product is still both controllable and observable during test and debug. Any manufacturing defect is preferably detectable during final test before a product is shipped. This basic necessity is difficult to achieve for complex designs without taking testability into account in the logic design phase, so that automatic test equipment can test the product.

In addition to testing for functionality and for manufacturing defects, application software development requires a similar level of simulation, observability and controllability in the system or sub-system design phase. The emulation phase of design should ensure that an IC (integrated circuit), or set of ICs, functions correctly in the end equipment or application when linked with the software programs.

With the increasing use of ICs in the automotive industry, telecommunications, defense systems, and life support systems, thorough testing and extensive real-time debug becomes a critical need.

Functional testing, wherein a designer is responsible for generating test vectors that are intended to ensure conformance to specification, still remains a widely used test methodology. For very large systems this method proves inadequate in providing a high level of detectable fault coverage. Automatically generated test patters would be desirable for full testability, and controllability and observability are key goals that span the full hierarchy of test (from the system level to the transistor level).

Another problem in large designs is the long time and substantial expense involved. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation approach, a large of subsequent design time is expended on test pattern creation and upgrading.

Even if a significant investment were made to design a module to be reusable and to fully create and grade its test patterns, subsequent use of the module may bury it in application specific logic, and make its access difficult or impossible. Consequently, it is desirable to avoid this pitfall.

The advances of IC design, for example, are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment even into the 7-figure range, and tighter tolerances.

Emulation technology utilizing scan based emulation and multiprocessing debug was introduced over 10 years ago. In 1988, the change from conventional in circuit emulation to scan based emulation was motivated by design cycle time pressures and newly available space for on-chip emulation. Design cycle time pressure was created by three factors: higher integration levels—such as on-chip memory; increasing clock rates—caused electrical intrusiveness by emulation support logic; and more sophisticated packaging—created emulator connectivity issues.

Today these same factors, with new twists, are challenging a scan based emulator's ability to deliver the system debug facilities needed by today's complex, higher clock rate, highly integrated designs. The resulting systems are smaller, faster, and cheaper. They are higher performance with footprints that are increasingly dense. Each of these positive system trends adversely affects the observation of system activity, the key enabler for rapid system development. The effect is called "vanishing visibility."

Application developers prefer visibility and control of all relevant system activity. The steady progression of integration levels and increases in clock rates steadily decrease the visibility and control available over time. These forces create a visibility and control gap, the difference between the desired visibility and control level and the actual level available. Over time, this gap is sure to widen. Application development tool vendors are striving to minimize the gap growth rate. Development tools software and associated hardware components must do more with less and in different ways; tackling the ease of use challenge is amplified by these forces.

With today's highly integrated System-On-a-Chip (SOC) technology, the visibility and control gap has widened dramatically. Traditional debug options such as logic analyzers and partitioned prototype systems are unable to keep pace with the integration levels and ever increasing clock rates of today's systems.

As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed, building system components in way that enabled the construction of prototyping systems with exposed buses. This approach is also under siege from the ever-increasing march of system clock rates. As CPU clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. We have entered an era where production devices must serve as the platform for application development.

Increasing CPU clock rates are also accelerating the demise of other simple visibility mechanisms. Since the CPU clock rates can exceed maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity.

As visibility and control diminish, the development tools used to develop the application become less productive. The tools also appear harder to use due to the increasing tool complexity required to maintain visibility and control. The visibility, control, and ease of use issues created by systems-on-a-chip are poised to lengthen product development cycles.

Even as the integration trends present developers with a difficult debug environment, they also present hope that new approaches to debug problems will emerge. The increased densities and clock rates that create development cycle time pressures also create opportunities to solve them.

On-chip, debug facilities are more affordable than ever before. As high speed, high performance chips are increasingly dominated by very large memory structures, the system cost associated with the random logic accompanying the CPU and memory subsystems is dropping as a percentage of total system cost. The cost of a several thousand gates is at an all time low, and can in some cases be tucked into a corner of today's chip designs. Cost per pin in today's high density packages has also dropped, making it easier to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs.

Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

The emulation technology of the present invention uses the debug upside opportunities noted above to provide developers with an arsenal of debug capability aimed at narrowing the control and visibility gap.

This emulation technology delivers solutions to the complex debug problems of today's highly integrated embedded real-time systems. This technology attacks the loss of visibility, control, and ease of use issues described in the preceding section while expanding the feature set of current emulators.

The on-chip debug component of the present invention provides a means for optimizing the cost and debug capabilities. The architecture allows for flexible combinations of emulation components or peripherals tailored to meet system cost and time to market constraints. The scalability aspect makes it feasible to include them in production devices with manageable cost and limited performance overhead.

According to the invention, emulation information indicative of internal operations of a data processor can be provided for use by an apparatus external to the data processor. A stream of emulation trace information indicative of data processing operations performed by the data processor is provided. A stream of timing information indicative of operation of a clock used by the data processor to perform data processing operations is also provided. The trace stream and the timing stream have inserted therein information indicative of a temporal relationship between the trace information and the timing information.

SUMMARY OF THE INVENTION

This invention is a technique for transmitting control commands via an emulation interface. This emulation interface includes a test clock signal and a test mode select signal. The transmitting entity could be the debug test system or the target system. The transmitting system holds the test clock signal at a constant value and switches the test mode select signal a number of times corresponding to the control command. The receiving system counts the number of times corresponding the test mode select signal switches while the test clock is constant and interprets the number of switches as a corresponding control command. In the preferred embodiment two switches is an escape signal for terminating test access shift state command, three switches is a soft reset command and four or more switches is a hard reset command.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
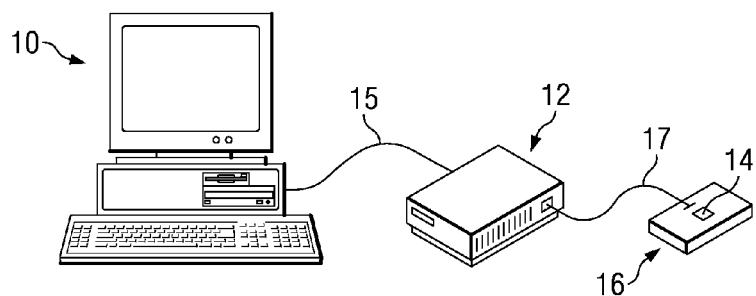
FIG. 1 diagrammatically illustrates exemplary embodiments of an emulation system according to the invention.

Emulation, debug, and simulation tools of the present invention are described herein. The emulation and debug solutions described herein are based on the premise that, over time, some if not most debug functions traditionally performed off chip must be integrated into the production device if they are to remain in the developer's debug arsenal. To support the migration of debug functions on chip, the present invention provides a powerful and scalable portfolio of debug capabilities for on-chip deployment. This technology preserves all the gains of initial JTAG technology while adding capabilities that directly assault the visibility, control, and ease of use issues created by the vanishing visibility trend.

Four significant architectural infrastructure components spearhead the assault on the control and visibility gap described earlier herein:
1. Real-time Emulation (RTE);
2. Real-time Data Exchange (RTDX is a trademark of Texas Instruments Incorporated);
3. Trace; and
4. Advanced Analysis.

Real-Time Emulation (RTE) provides a base set of fixed capabilities for real-time execution control (run, step, halt, etc.) and register/memory visibility. This component allows the user to debug application code while real-time interrupts continue to be serviced. Registers and memory may be accessed in real-time with no impact to interrupt processing. Users may distinguish between real-time and non real-time interrupts, and mark code that must not be disturbed by real-time debug memory accesses. This base emulation capability includes hardware that can be configured as two single point hardware breakpoints, a single data watchpoint, an event counter, or a data logging mechanism. The EMU pin capability includes trigger I/Os for multiprocessor event processing and a uni-directional (target to host) data logging mechanism.

RTDX™ provides real-time data transfers between an emulator host and target application. This component offers both bi-directional and uni-directional DSP target/host data transfers facilitated by the emulator. The DSP (or target) application may collect target data to be transferred to the host or receive data from the host, while emulation hardware (within the DSP and the emulator) manages the actual transfer. Several RTDX™ transfer mechanisms are supported, each providing different levels of bandwidth and pin utilization allowing the trade off of gates and pin availability against bandwidth requirements.

Trace is a non-intrusive mechanism of providing visibility of the application activity. Trace is used to monitor CPU related activity such as program flow and memory accesses, system activity such as ASIC state machines, data streams and CPU collected data. Historical trace technology also used logic analyzer like collection and special emulation (SEs) devices with more pins than a production device. The logic analyzer or like device processed native representations of the data using a state machine like programming interface (filter mechanism). This trace model relied on all activity being exported with external triggering selecting the data that needed to be stored, viewed and analyzed.

Existing logic analyzer like technology does not, however, provide a solution to decreasing visibility due to higher integration levels, increasing clock rates and more sophisticated packaging. In this model, the production device must provide visibility through a limited number of pins. The data exported is encoded or compressed to reduce the export bandwidth required. The recording mechanism becomes a pure recording device, packing exported data into a deep trace memory. Trace software is used to convert the recorded data into a record of system activity.

Emulator capability is created by the interaction of four emulator components:
Debugger application program;
Host computer;
Emulation controller; and
On-chip debug facilities.

These components are connected as shown in FIG. 1. The host computer 10 is connected to an emulation controller 12 (external to the host) with the emulation controller (also referred to herein as the emulator or the controller) also connected to the target system 16. The user preferably controls the target application through a debugger application program, running on the host computer, for example, Texas Instruments Code Composer Studio program.

A typical debug system is shown in FIG. 1. This system uses a host computer 10 (generally a PC) to access the debug capabilities through an emulator 12. The debugger application program presents the debug capabilities in a user-friendly form via the host computer. The debug resources are allocated by debug software on an as needed basis, relieving the user of this burden. Source level debug utilizes the debug resources, hiding their complexity from the user. The debugger together with the on-chip Trace and triggering facilities provide a means to select, record, and display chip activity of interest. Trace displays are automatically correlated to the source code that generated the trace log. The emulator provides both the debug control and trace recording function.

The debug facilities are programmed using standard emulator debug accesses through the target chips' JTAG or similar serial debug interface. Since pins are at a premium, the technology provides for the sharing of the debug pin pool by trace, trigger, and other debug functions with a small increment in silicon cost. Fixed pin formats are also supported. When the sharing of pins option is deployed, the debug pin utilization is determined at the beginning of each debug session (before the chip is directed to run the application program), maximizing the trace export bandwidth. Trace bandwidth is maximized by allocating the maximum number of pins to trace.

The debug capability and building blocks within a system may vary. The emulator software therefore establishes the configuration at run-time. This approach requires the hardware blocks to meet a set of constraints dealing with configuration and register organization. Other components provide a hardware search capability designed to locate the blocks and other peripherals in the system memory map. The emulator software uses a search facility to locate the resources. The address where the modules are located and a type ID uniquely identifies each block found. Once the IDs are found, a design database may be used to ascertain the exact configuration and all system inputs and outputs.

The host computer is generally a PC with at least 64 Mbytes of memory and capable of running at least Windows95, SR-2, Windows NT or later versions of Windows. The PC must support one of the communications interfaces required by the emulator, for example:
Ethernet 10T and 100T, TCP/IP protocol;
Universal Serial Bus (USB), rev 1.x;
Firewire, IEEE 1394; and/or
Parallel Port (SPP, EPP, and ECP).

The emulation controller 12 provides a bridge between the host computer 10 and target system 16, handling all debug information passed between the debugger application running on the host computer and a target application executing on a DSP (or other target processor) 14.

One exemplary emulator configuration supports all of the following capabilities:
Real-time Emulation;
RTDX™;
Trace; and
Advanced Analysis.

Additionally, the emulator-to-target interface supports:
Input and output triggers;
Bit I/O; and
Managing special extended operating modes.

The emulation controller 12 accesses Real-time Emulation capabilities (execution control, memory, and register access) via a 3, 4, or 5 bit scan based interface. RTDX™ capabilities can be accessed by scan or by using three higher bandwidth RTDX™ formats that use direct target-to-emulator connections other than scan. The input and output triggers allow other system components to signal the chip with debug events and vice-versa.

The emulator 12 is partitioned into communication and emulation sections. The communication section supports communication with the host 10 on host communication links while the emulation section interfaces to the target, managing target debug functions and the device debug port. The emulator 12 communicates with the host computer 10 using e.g., one of the aforementioned industry standards communication links at 15. The host-to-emulator connection can be established with off the shelf cabling technology. Host-to-emulator separation is governed by the standards applied to the interface used.

The emulation controller 12 communicates with the target system 16 through a target cable or cables at 17. Debug, Trace, Triggers, and RTDX™ capabilities share the target cable, and in some cases, the same device pins. More than one target cable may be required when the target system deploys a trace width that cannot be accommodated in a single cable. All trace, RTDX™, and debug communication occurs over this link.

Figure 2:
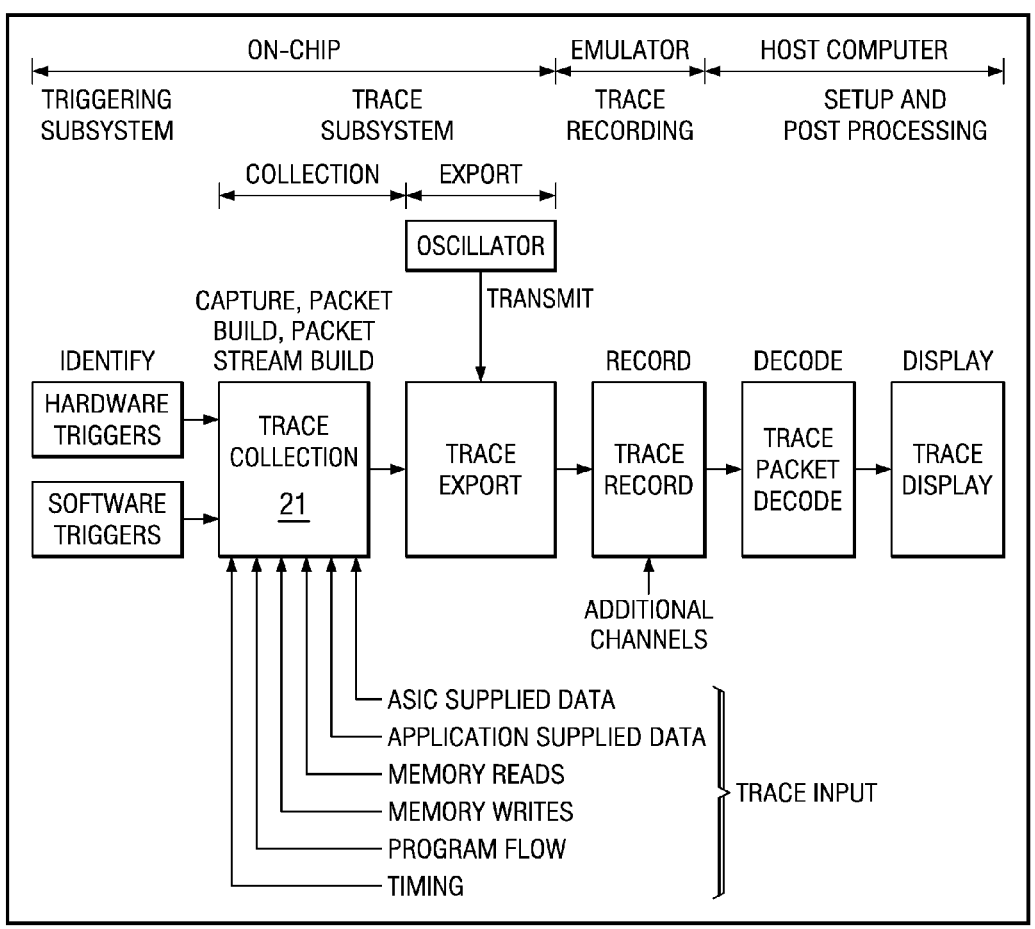
FIG. 2 diagrammatically illustrates portions of the emulation system of FIG. 1 in greater detail.

FIG. 2 diagrammatically illustrates pertinent portions of exemplary embodiments of a trace system within the emulation system of FIG. 1. As shown in FIG. 2, the trace system includes a triggering subsystem and a trace subsystem provided on a target chip, a trace recorder provided in the emulator and a setup and post processing portion provided in the host computer.

The triggering subsystem is operable for identifying hardware and software triggers, for example in any desired conventional manner. The trace subsystem includes a trace collection portion (or trace collector) 21 coupled to the triggering subsystem for receiving the hardware and/or software triggers. The trace collector also receives conventional trace input information from a plurality of sources (for example, timing information, program flow information, memory write information and memory read information), and produces therefrom a stream of trace packets including trace information. The trace subsystem further includes a trace export portion which receives the trace packet stream and formats it appropriately into a stream of transmission packets which are output from the trace export portion to suitable output pins (for example a debug port or a system bus port) of the target chip. The stream of transmission packets is delivered from the pin boundary of the target chip to a trace recorder within the emulator. The trace recorder (also referred to as a trace receiver) can be, for example, a dumb recording mechanism that merely records the trace stream provided from one or more trace channels (note the additional channels illustrated in FIG. 2). The host computer can retrieve the recorded packets at a later time, decode the retrieved packets in a trace packet decoder, and display the decoded packet information in a trace display.

Some exemplary embodiments of the trace collector 21 utilize 10-bit encoding to represent trace information such as program counter (PC) information, memory read information, memory write information and timing information. Other, wider encoding formats can also be used. Moreover, as explained in detail below, all of the aforementioned exemplary types of information can be transmitted to the emulator across the same pins of the target chip. The aforementioned 10-bit encoding results in 10-bit packets which can contain opcodes or data, or both opcodes and data. Each encoded packet contains an opcode that indicates the type of information that is being sent. Thus, for a 2-bit long opcode, the remaining 8 bits of the encoded packet will represent data associated with the 2-bit opcode. On the other hand, an encoded packet that includes a 10-bit opcode cannot include any data bits.

The interpretation of a command is dependent upon two factors, the command opcode and the number of parameters included in the command. In other words, for example, a command opcode packet has one meaning if it is immediately followed by another command opcode packet, but can have an entirely different meaning if it is immediately followed by continue packets.

In many cases, additional data needs to be associated with a given opcode. For example, with a 2-bit opcode, only 8 additional bits are available in the current packet. If more than 8 additional bits are necessary to communicate the desired information, then the additional data bits can be included in subsequent packets, referred to herein as data packets or continue packets. A continue packet is uniquely identifiable, for example by having its two most significant bits set to define an opcode of 10. This opcode is referred to herein as the continue opcode. The data bits contained in a continue packet can represent information that is associated with a previous packet containing an opcode other than the 10 continue opcode.

A sequence of packets that begins with an opcode (i.e., other than a continue opcode) packet and includes all needed continue (or data) packets following the opcode packet is referred to herein as a command. The initial non-continue opcode is referred to as the command opcode. A command can have 0 or more parameters. Each parameter can be an independent piece of data associated with the command opcode. The number of parameters expected depends on the command opcode. Each parameter of a command can be encoded as a sequence of one or more packets, the first of which is identified by a "beginning of parameter" opcode, and the remainder of which are continue packets.

Figure 3:
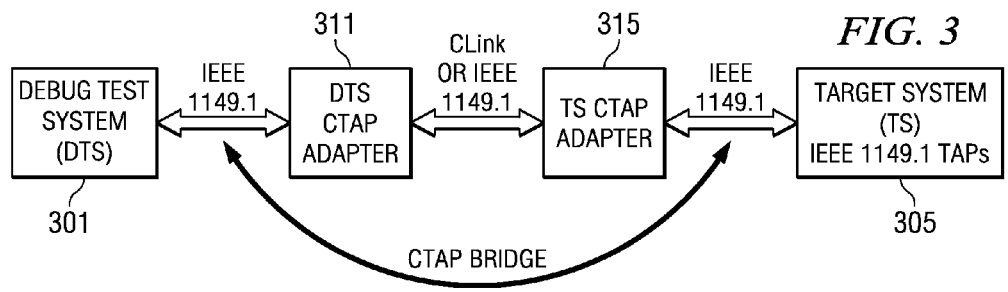
FIG. 3 diagrammatically illustrate the relationship between the debug and test system and the target system in this invention.

This invention is used in a Compact Test Access Port (CTAP). A CTAP interface utilizes the existing IEEE 1149.1 (JTAG) standard as the basis for its existence. It provides a bi-modal interface between the Debug and Test System (DTS) 301 and Target System (TS) 305. IEEE 1149.1 interfaces 311 and 315 are shown in FIG. 3. The operating mode is IEEE 1149.1 compliant from power-up. The CLink operating mode provides a more compact interface, extends the interface capabilities, and maintains underlying IEEE 1149.1 control mechanisms. Additionally it provides several extensions to the IEEE 1149.1 standard. The CLink operating mode is invoked by IEEE scan sequences after power-up. The DTS 301 may be a scan controller (SC), automatic test equipment (ATE), or chip production test equipment (PTE). The use of the term JTAG and IEEE 1149.1 within this document are to be viewed as synonymous.

This CTAP interface provides:

A standard JTAG interface to TS 305 test access ports (TAPs);

A compact debug and test interface (CLink) between DTS 301 and TS 305 TAPs;

Dynamic switching between these two interfaces.

The CTAP interface:

Provides an interface that uses one half or one quarter of the pins of the standard JTAG interface;

Provides backwards compatibility and an upgrade path for existing tool chains;

Provides backwards compatibility with Silicon (on-chip) intellectual property (IP);

Provides debug access that is independent of CPU and debug technology;
Provides for wakeup/power down of the TS CTAP adapter for power savings
Targets operating frequencies from DC to 100 MHz;
Provides for background data transfers concurrent with JTAG scan transactions;
Accommodates slow system response e.g. power save modes or component clock limitations;
Supports hot connect of DTS to TS without system disruption;
JTAG start-up;
Software initiated switching between the JTAG and CLink interfaces;
Multi-device CLink operation with up to 16 devices per CLink interface;
Failsafe and robustness features.

The CTAP interface utilizes the JTAG standard as its foundation and extends the capabilities of this standard. The CTAP interface may be operated in two modes: JTAG; and Clink.

In JTAG mode, CTAP supports all modes, state transitions, and capabilities afforded by the four-pin interface. JTAG transactions pass between the DTS and TS in their native format in this mode. This allows CTAP enabled equipment backwards compatibility with existing JTAG compatible systems.

In CLink mode, the CTAP Bridge including interfaces 311 and 315 manages JTAG transactions. The bridge serializes and compresses information associated with these transactions. The compression reduces the impact of the lower pin count of the CLink interface. Clock by clock, the native transactions are reformatted to discard irrelevant information, encode information in more efficient forms, and utilize link bandwidth in a manner that extends the link capability. When the DTC supplies a clock, additional control information may be transmitted through clock/data relationships, further increasing link efficiency. The CLink mode not only uses fewer pins than JTAG (TCK and TMS), it extends the capabilities of this interface with background data transfers, stalls on slow system response, and provides a more robust interface. It may also be configured to provide hot connect protection and provides a distributed scan path linker capability in JTAG mode. The bridge supports dynamic switching between the interface modes with these changes controlled by standard scan sequences.

The TMS pin becomes bi-directional once the interface operating mode is changed to CLink. CLink uses the TMSC pin with four drive configurations within the TS:
An input—with a keeper configured as a pull-up;
Drive high only—multiple sources may drive, with a keeper;
Drive low only—multiple sources may drive, with a keeper; and
Drive high or low—a single source may drive the pin.

The CLink protocol defines the TMSC drive configuration on a clock by clock basis. The drive high only and drive low only support the simultaneous data output by multiple devices (Wire-ANDed data).

These operating modes and the movement between them facilitates CTAP provides: startup simplicity; flexibility/multi-device operation; and performance optimizations.

A number of DTS link control commands may be generated when the DTS or TS is generating output. In each case, DTS generates the command by holding TCK high and toggling TMSC a specific number of times. The number of TMSC edges while the TMSC pin is high identifies the command. TMSC edges are counted only when the CTAP is not sourcing the TMSC pin. TMCS edges generated by CTAP output are ignored.

The CTAP identifies an auxiliary command by counting the number of edges in the TMSC signal within a TCK period. Zero or one edge is considered no command. More than one edge is considered a command. The preferred embodiment includes three commands detailed in Table 1.

TABLE 1

| Command | TMSC Edges | Description |
| --- | --- | --- |
| Escape | 2 | Terminate TAP shift state or Terminate scan Segment |
| Soft Reset | 3 | Reset the Scan format to OScan 7 if DTS supplied TCK or to the power on reset (POR) scan format (ISCAN0 or ISCAN1) if the TS supplies TCK. |
| Hard Reset | 4 or more | Reset the Scan format to the power on reset (POR) scan format (ISCAN0 or ISCAN1) |

Figure 4:
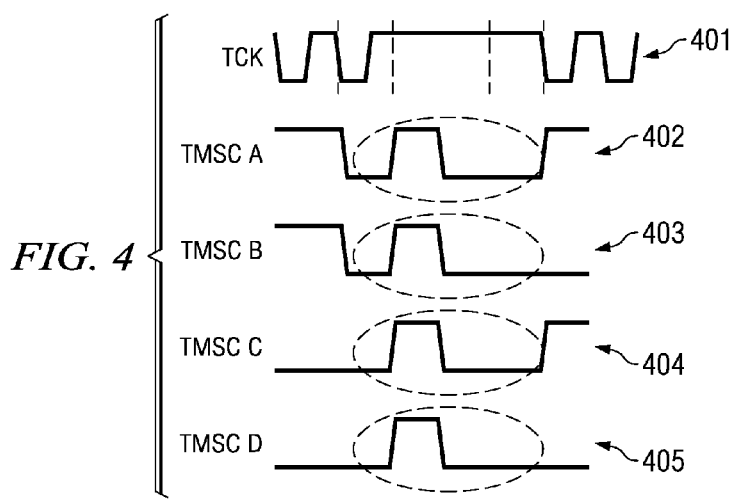
FIG. 4 illustrates an example auxiliary link command when the debug test system is generating output.
Figure 5:
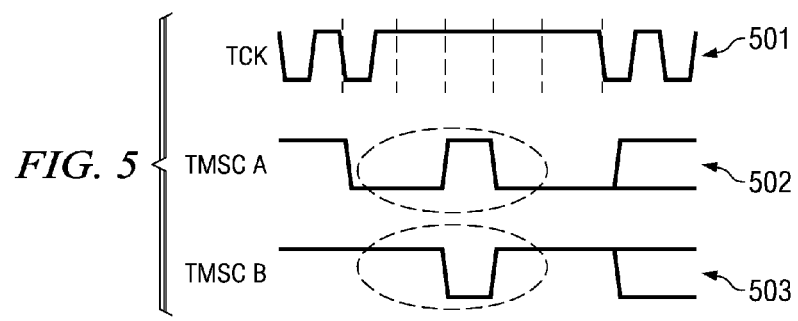
FIG. 5 illustrates an example auxiliary link command when the target system is generating output.

An auxiliary link command beginning when DTS 301 is generating output is shown in FIG. 4. An auxiliary link command beginning when TS 305 is generating output is shown in FIG. 5.

Escape can also be generated when the TS is generating output. This is shown in FIG. 5. In the case TS 305 drives the TMSC pin with DTS 310 holding TCK high beginning with this period. DTS 301 then reads the data, drives the TMSC pin to the inverted data value it just read followed by driving the TMSC pin to a one during the following period.

Note that both the input and output escape sequences provide a one clock period where the last TMSC value is stable so that there are no setup timing considerations for this operation.

Figure 6:
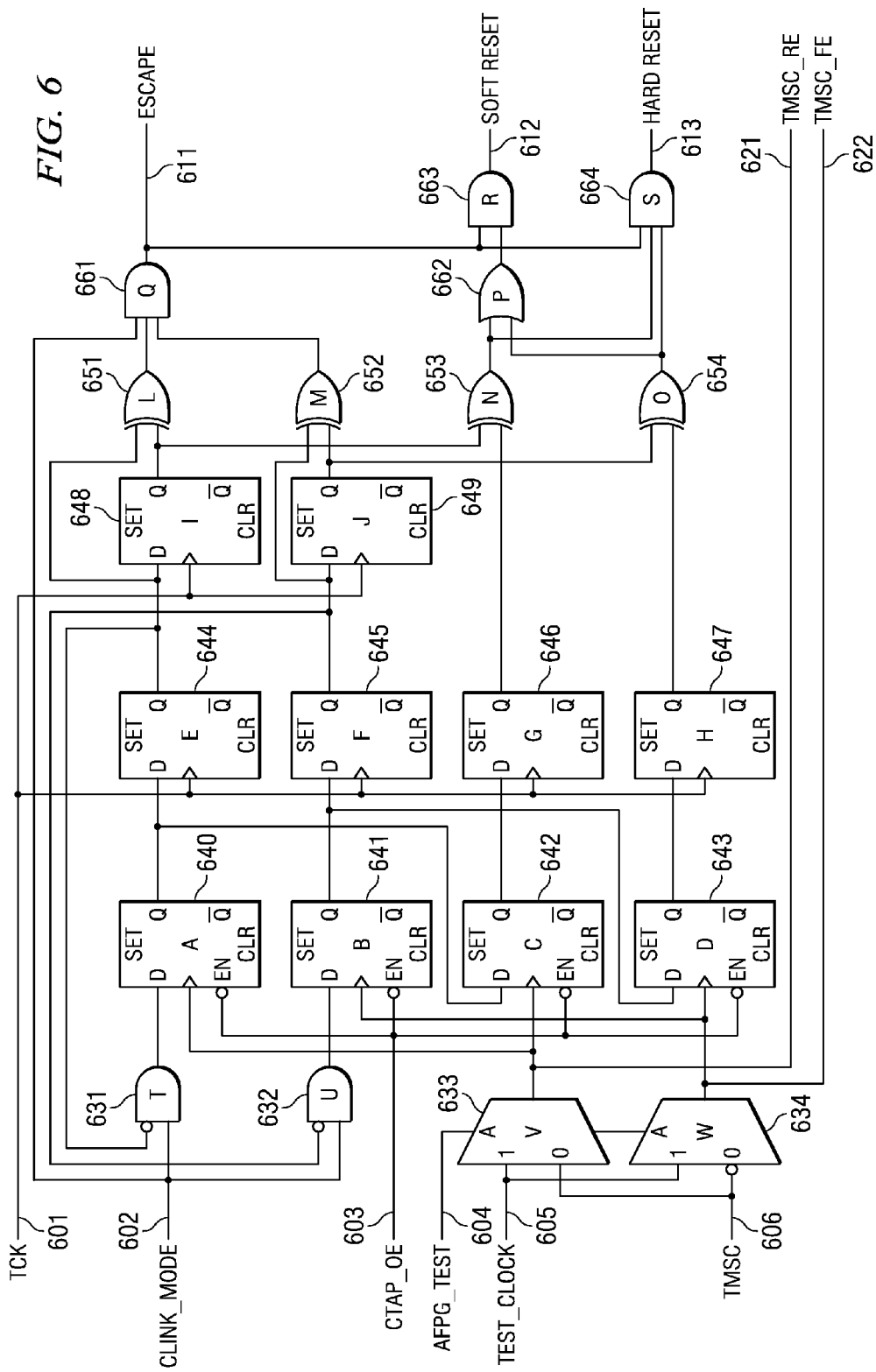
FIG. 6 is a schematic diagram of a circuit for receiving and interpreting auxiliary link commands of this invention.

FIG. 6 illustrates a circuit for determining the number of edges occurring between TCK falling edges. This circuit is understood in conjunction with the Truth Table shown in Table 2. Flip-flops 644, 645, 646, 647, 648 and 649 are clocked via TCK 601. The CLINK_MODE 602 signal conditions AND gates 631, 632 and 661. In the Clink mode, these AND gates are enabled to permit circuit operation. In the JTAG mode, these AND gates are disabled. This prevents the feedback from flip-flop 644 to flip-flop 640 at AND gate 631, the feedback from flip-flop 645 to flip-flop 641 at AND gate 632 and disables production of the Escape 611 signal at AND gate 611. This is in accordance with the preferred embodiment in which the auxiliary link control commands are used only in the Clink mode.

AFPG_TEST 604 controls multiplexers 633 and 634. In the test mode, multiplexers 633 and 634 select TEST_CLOCK 605. In the normal mode, multiplexer 633 selects TMSC 606 and multiplexer 634 selects an inverted TMSC 606. During the normal mode, flip-flops 640 and 642 are clocked by a rising edge of TMSC 606 and flip-Flops 641 and 643 are clocked by a falling edge of TMSC 606 as inverted at the input to multiplexer 634. TMSC_RE 621 and TMSC_FE 622 output the multiplexer selections. CTAP_OE 603 indicates whether CTAP is sourcing TMSC 606. This invention operates only when CTAP is not sourcing TMSC 606. When CTAP_OE 605 is active, flip-flops 640, 641, 642 and 643 are disabled via the inverting enable inputs. This prevents CTAP from generating its own auxiliary commands.

Flip-flops 644, 645, 646 and 647 store the output of respective flip-flops 640, 641, 642 and 643 received on their D inputs upon the falling edge of TCK 601. This begins a clock period and the count window for the new period. There are two TMSC edge detection channels, one for rising edge and one for falling edge. The each channel provides reference value feedback generated in the TCK domain from flip-flops 644 and 645 to the TMSC clock domain at flip-flops 640 and 641. AND gates 631 and 632 form the inverse of the reference values from flip-flops 644 and 645 and supplies this inverse to the D inputs of flip-flops 640 and 641. The reference value is delayed by on clock in the TCK domain via flip-flops 648 and 649. If a rising edge occurs in TMSC 606, the reference value from flip-flop 644 is clocked into flip-flop 640. On the subsequent falling edge of TCK moving the value in flip-flop 640 is moved back into flip-flop 644. Since a copy of the flip-flop 644 value on the previous clock is stored in flip-flop 648, XOR 651 outputs a 1 when at least one a rising edge has occurred on TMSC 606 between to consecutive TCK 601 falling edges. The same detection mechanism is implemented to detect TMCS 606 falling edges between consecutive TCK 601 falling edges using flip-flops 641, 645 and 649.

AND gate 661 of XORs 651 and 652 generates a 1 when both a positive and negative edge occurred on TMSC 606 between two consecutive TCK 601 falling edges. This concept is extended to count more than two edges by adding shift register stages following flip-flops 640 and 642. As many stages as required may be added to count edges. In this embodiment, one additional stage is added. This allows counting 0, 1, or 2 TMSC 606 rising edges or 0, 1, or 2 falling TMSC 606 edges between consecutive TCK falling edges.

Since rising and falling TMSC 606 edges occur in alternating order, the output of flip-flops 642 and 643 can be moved to the TCK domain using flip-flops 646 and 647. Since flip-flop outputs 642 and 643 are delayed versions of flip-flops 640 and 641, they will only be the same as flip-flops 640 and 641 when more than one TMSC 606 edge occurs during the same TCK 601 period. XOR gate 653 receives the output of flip-flops 648 and 645. XOR gate 654 received the outputs of flip-flops 649 and 647.

OR gate 662, AND gate 663 and AND gate 644 form the circuit outputs. Upon detection of two TMSC 606 edges between consecutive TCK 601 edges, AND gate 661 generates an output. In this embodiment this is interpreted as escape signal 611. On three such edges, AND gate 663 generates and output. In this embodiment this it interpreted as soft reset signal 612. On four or more such edges, AND gate 664 generates an output. In this embodiment this is interpreted as hard reset signal 613.

Table 2 shows the flip-flop states for the various number of detected edges. Note the "x" state is a don't care state, that is, the output determination does not depend upon the corresponding flip-flop state.

TABLE 2

| Edges | FF I | FF J | FF E | FF F | FF G | FF H |
|---|---|---|---|---|---|---|
| 4 | 1 | 1 | 1 | 1 | 1 | 1 |
| 3 | 1 | 1 | 1 | 1 | 1 | 0 |
| 3 | 1 | 1 | 1 | 1 | 0 | 1 |
| 2 | 1 | 1 | 1 | 1 | 0 | 0 |
| 1 | 1 | 1 | 1 | 0 | x | x |
| 1 | 1 | 1 | 0 | 1 | x | x |
| 0 | 1 | 1 | 0 | 0 | x | x |
| 4 | 1 | 0 | 1 | 0 | 1 | 0 |
| 3 | 1 | 0 | 1 | 0 | 1 | 1 |
| 3 | 1 | 0 | 1 | 0 | 0 | 0 |
| 2 | 1 | 0 | 1 | 0 | 0 | 1 |
| 1 | 1 | 0 | 1 | 1 | x | x |
| 1 | 1 | 0 | 0 | 0 | x | x |
| 0 | 1 | 0 | 0 | 1 | x | x |
| 4 | 0 | 1 | 0 | 1 | 0 | 1 |
| 3 | 0 | 1 | 0 | 1 | 1 | 1 |
| 3 | 0 | 1 | 0 | 1 | 0 | 0 |
| 2 | 0 | 1 | 0 | 1 | 1 | 0 |
| 1 | 0 | 1 | 1 | 1 | x | x |
| 1 | 0 | 1 | 0 | 0 | x | x |
| 0 | 0 | 1 | 1 | 0 | x | x |
| 4 | 0 | 0 | 0 | 0 | 0 | 0 |
| 3 | 0 | 0 | 0 | 0 | 0 | 1 |
| 3 | 0 | 0 | 0 | 0 | 1 | 0 |
| 2 | 0 | 0 | 0 | 0 | 1 | 1 |
| 1 | 0 | 0 | 0 | 1 | x | x |
| 1 | 0 | 0 | 1 | 0 | x | x |
| 0 | 0 | 0 | 1 | 1 | x | x |

One advantage of this invention over other methods of edge detection is the testability aspects of this circuit. The circuit may be easily made 100% testable using two different test methodologies. Stuck fault testing or logic BIST may be used to test all flip-flops and combinational logic provided a clock multiplexer is used to change the clock source for flip-flops 640, 641, 642 and 643 during test mode enabled via multiplexers 633 and 634. If another test mode makes TMSC_RE and TMSC_FE visible through pins or the input to other test logic without selecting the test clock to this set of flip-flops, the circuit becomes 100% testable using a combination of these two test methodologies.

The circuit illustrated in FIG. 6 can be used to count only rising or only falling edges by deleting the unneeded part of the circuit.

Figure 7:
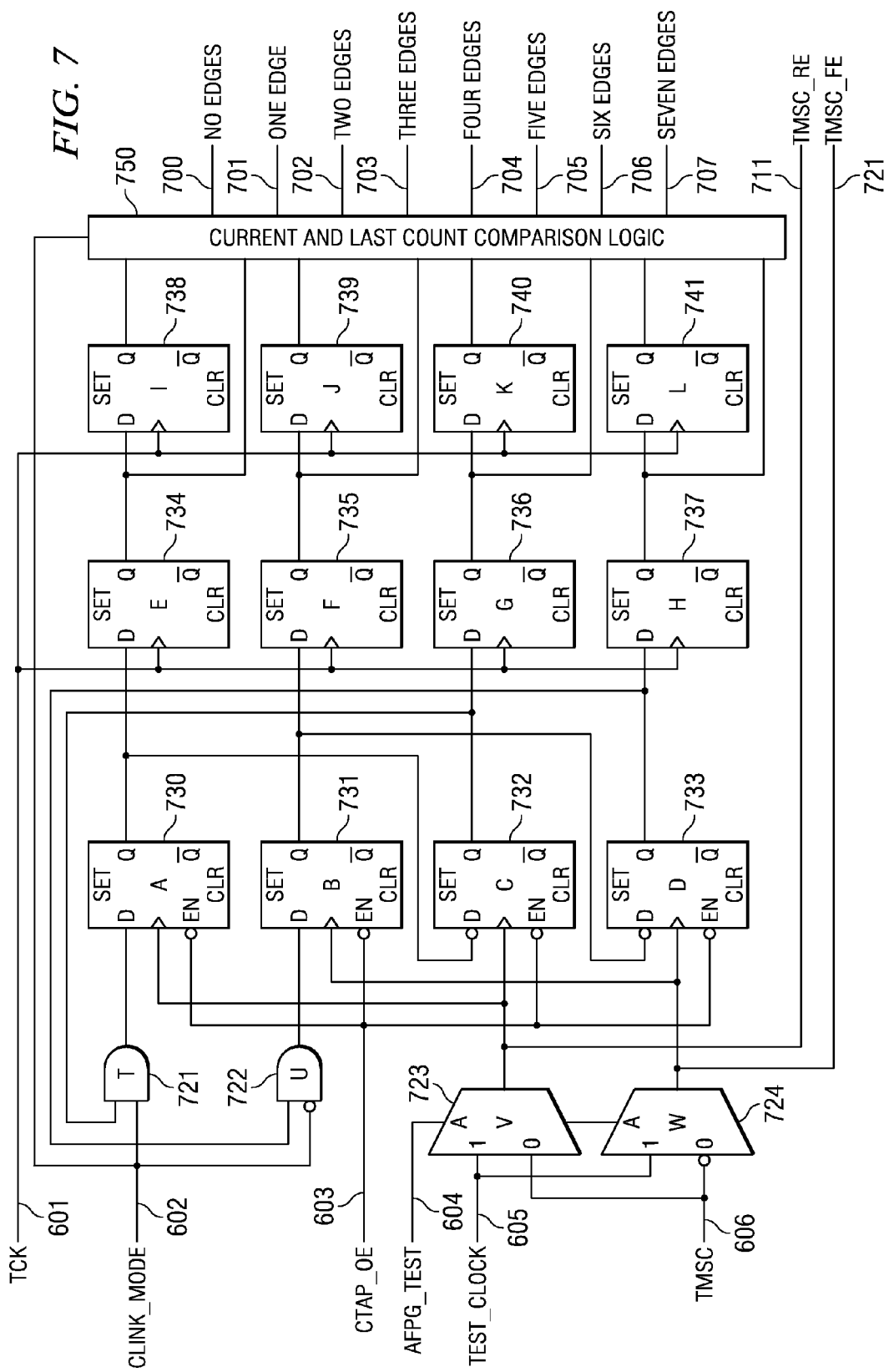
FIG. 7 is a schematic diagram of an alternative circuit for receiving and interpreting auxiliary link commands of this invention.

The circuit of FIG. 6 may be modified to use a counter value passed across the interface. This is illustrated in FIG. 7. The front end including AND gates 721 and 722, multiplexers 723 and 724 and flip-flops 730, 731, 732 and 732 correspond generally to the similar parts illustrated in FIG. 6. However, the feedback to flip-flop 730 comes from flip-flop 732 and the feedback to flip-flop 731 comes from flip-flop 733. Flip-flops 734, 735, 736, 737, 738, 739, 740 and 741 are clocked by TCK 601. Flip-flops 734 and 737 each delay the output of flip-flop 730 by one clock period. Flip-flops 735 and 738 each delay the output of flip-flop 731 by one clock period. Flip-flops 736 and 740 each delay the output of flip-flop 732 by one clock period. Flip-flops 737 and 741 each delay the output of flip-flop 733 by one clock period.

Current and last count comparison logic 750 is enabled when CLINK_MODE 602 indicates the Clink mode. Current and last count comparison logic 750 receives the outputs of flip-flips 734 to 741. Current and last count comparison logic 750 generates outputs no edges 700, one edge 701, two edges 702, three edges 703, four edges 704, five edges 705, six edges 706 and seven edges 707 dependent upon the number of TMSC 606 edges between consecutive TCK 601 edges. This determination is made via a truth table similar to Table 2.

What is claimed is:

1. A control command receive circuit comprising:
  a first flip-flop having a D input, a clock input receiving a test mode select signal and an output;
  a second flip-flop having a D input, a clock input receiving an inverted test mode select signal and an output;
  a third flip-flop having a D input connected to said output of said first flip-flop, a clock input receiving said test mode select signal and an output;
  a fourth flip-flop having a D input connected to said output of said second flip-flop, a clock input receiving said inverse test mode select signal and an output;

a fifth flip-flop having a D input connected to said output of said first flip-flop, a clock input receiving a test clock signal and an output;

a first inverter having an input connected to said output of said fifth flip-flop and an output connected to said D input of said first flip-flop;

a sixth flip-flop having a D input connected to said output of said second flip-flop, a clock input receiving said test clock signal and an output;

a second inverter having an input connected to said output of said sixth flip-flop and an output connected to said D input of said second flip-flop;

a seventh flip-flop having a D input connected to said output of said third flip-flop, a clock input receiving said test clock signal and an output;

an eighth flip-flop having a D input connected to said output of said fourth flip-flop, a clock input receiving said test clock signal and an output;

a ninth flip-flop having a D input connected to said output of said fifth flip-flop, a clock input receiving said test clock signal and an output;

a tenth flip-flop having a D input connected to said output of said sixth flip-flop, a clock input receiving said test clock signal and an output;

a first exclusive OR gate having a first input connected to said output of said ninth flip-flop, a second input connected to said output of said fifth flip-flop and an output;

a second exclusive OR gate having a first input connected to said output of said tenth flip-flop, a second input connected to said output of said sixth flip-flop and an output;

a third exclusive OR gate having a first input connected to said output of said ninth flip-flop, a second input connected to said output of said seventh flip-flop and an output;

a fourth exclusive OR gate having a first input connected to said output of said tenth flip-flop, a second input connected to said output of said eighth flip-flop and an output;

a first AND gate having a first input connected to said output of said first exclusive OR gate, a second input connected to said output of said second exclusive OR gate and an output forming a first command signal;

an OR gate having a first input connected to said output of said third exclusive OR gate, a second input connected to said output of said fourth exclusive OR gate and an output;

a second AND gate having a first input connected to said output of said first AND gate, a second input connected to said output of said OR gate and an output forming a second command signal;

and a third AND gate having a first input connected to said output of said first AND gate, a second input connected to said output of said third exclusive OR gate, a third input connected to said output of said fourth exclusive OR gate and an output forming a third command signal.

2. The circuit of claim 1, wherein: said first inverter consists of a fourth AND gate having an inverting input connected to said output of said fifth flip-flop, a second input receiving a mode signal and an output connected to said D input of said first flip-flop; and said second inverter consists of a fifth AND gate having an inverting input connected to said output of said sixth flip-flop, a second input receiving said mode signal and an output connected to said D input of said second flip-flop.

3. The circuit of claim 1, wherein:

each of said first, second, third and fourth flip-flops includes an enable input receiving a mode signal.

4. The circuit of claim 1, further comprising:

a first multiplexer having a first input receiving a test clock signal, a second input receiving said test mode select signal, a control input receiving a test mode signal indicating a test mode or a normal mode and an output connected to said clock input of said first and third flip-flops, said first multiplexer coupling said first input to said output when said test mode signal indicates said test mode and coupling said second input to said output when said test mode signal indicates said normal mode; and a second multiplexer having a first input receiving a test clock signal, a second inverting input receiving said test mode select signal, a control input receiving said test mode signal indicating a test mode or a normal mode and an output connected to said clock input of said second and fourth flip-flops, said second multiplexer coupling said first input to said output when said test mode signal indicates said test mode and coupling said second inverting input to said output when said test mode signal indicates said normal mode.

* * * * *